Figure 1:
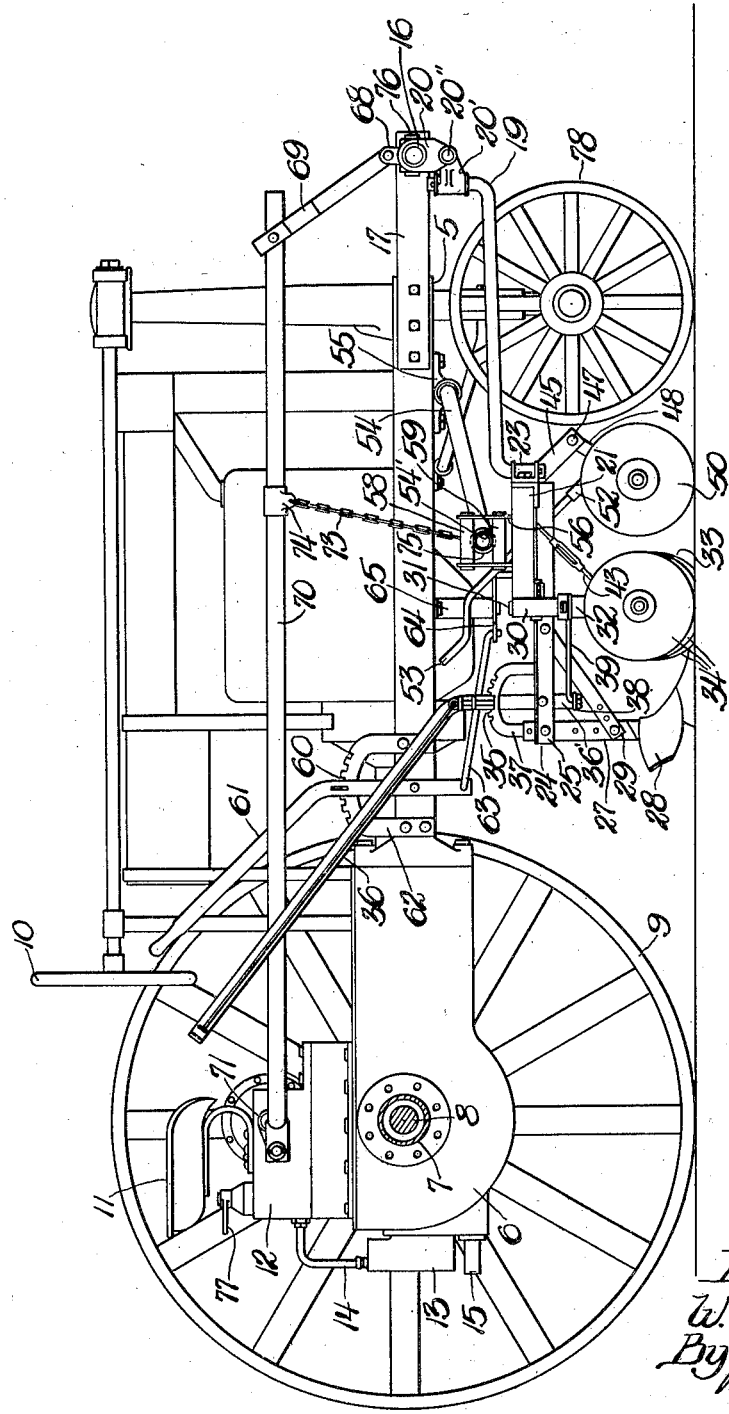

Feb. 16, 1937.  W. S. GRAHAM  2,071,118
CULTIVATOR ATTACHMENT FOR TRACTORS
Filed Feb. 29, 1936  2 Sheets-Sheet 1

Inventor
W. S. Graham
By V. F. Lasaque
Atty.

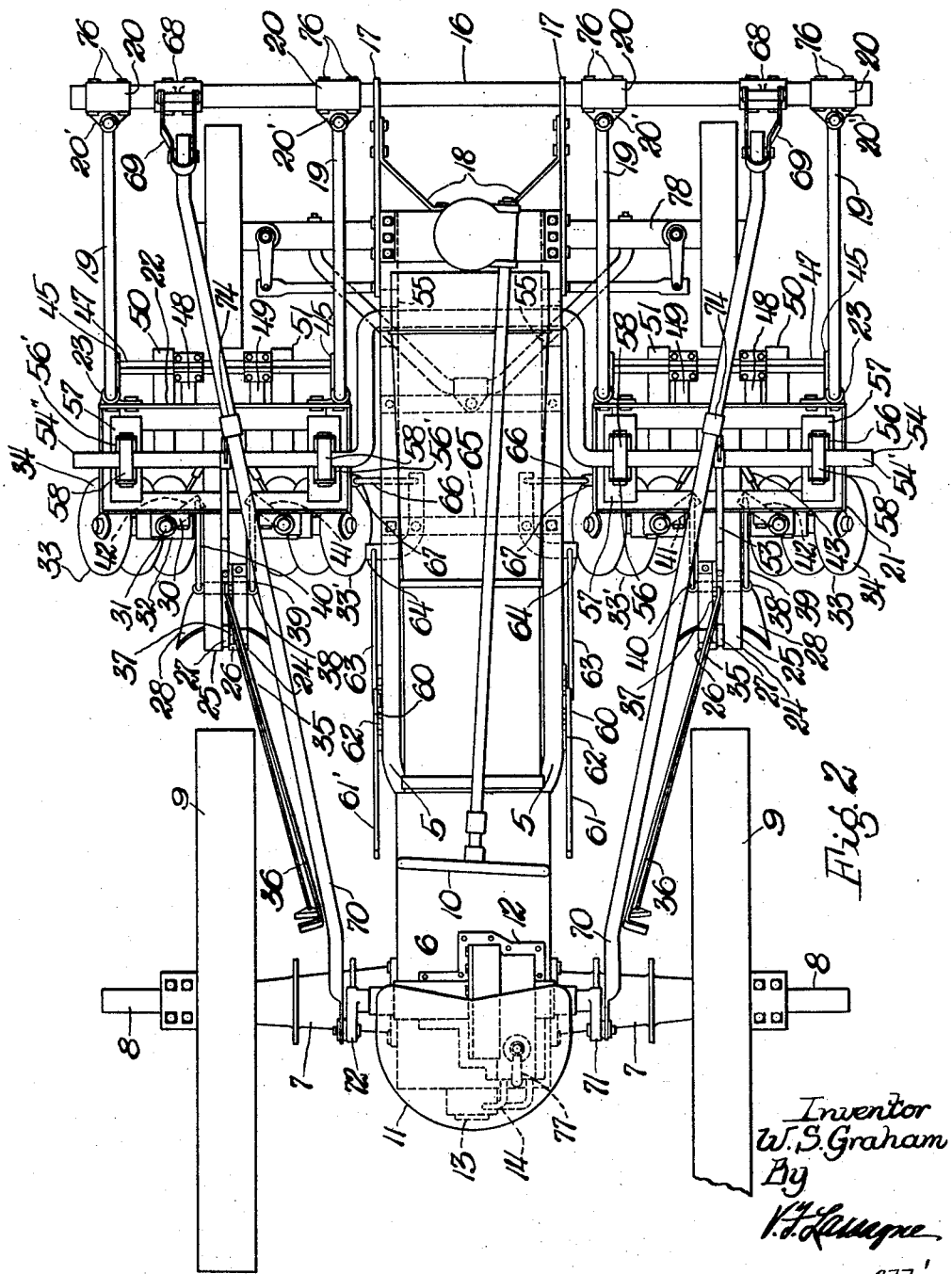

Patented Feb. 16, 1937

2,071,118

UNITED STATES PATENT OFFICE 2,071,118

CULTIVATOR ATTACHMENT FOR TRACTORS

William S. Graham, Canton, Ill., assignor to International Harvester Company, a corporation of New Jersey Application February 29, 1936, Serial No. 66,353

20 Claims. (Cl. 97—47)

This invention relates to implement attachments for tractors and more specifically for a cane cultivator attachment directly connected to the forward part of the type of tractor known as a general purpose tractor.

One object of the invention is to provide the cultivator attachment with means for stabilizing the cultivator with respect to the tractor.

Another object of the invention is to provide adjustable disk gangs which may be adjusted for in-throw out-throw working of the soil and also adjustable laterally for the correct working of the soil of the cane beds.

Another object of the invention is to adapt the cultivator to the wide tread type of tractor in which the rear wheels are adjustable in order that they may follow the furrows between the cane beds.

Another object of the invention is to provide a power lift mechanism operated from the tractor engine to raise and lower the implement frame structure.

Other objects and advantages will appear in the following description of the preferred embodiment of the invention, as illustrated in the accompanying drawings, wherein:

Figure 1 is a side elevation of the tractor with the right rear wheel removed showing the cane cultivator attachment in working position; and, Figure 2 is a plan view of the tractor with the cane cultivator attached.

The invention is herein disclosed in combination with a tractor comprising longitudinal frame members 5 connected at their rear ends to a longitudinal transmission housing 6 to which rear axle housings 7 are attached. In the transverse axle housing 7 are journaled differentially driven axle shafts 8 which drive each of the traction wheels 9. The rear tractor wheels 9 are adjustable laterally on the rear axle shafts 8 in order to conform to the various row spacings. The fore-carriage may be the high wheel extension or the low wheel type which is standard equipment which is disclosed and claimed in the co-pending application of William S. Graham, Serial No. 66,354, filed February 29, 1936. The front axle or forecarriage is preferably of the automobile type and the tractor is steered through a steering wheel 10 adjacent an operator's station 11. Attached to the transmission housing 6 at its rear end and in line with the rear axle housings is a hydraulic power lift attachment 12. This power lift attachment is driven from the engine by means of mechanism connected to the transmission which drives a hydraulic gear pump 13 which produces sufficient pressure to actuate the hydraulic lift. The pressure of the oil is transmitted through a pipe 14 to the hydraulic lift mechanism. It is also to be understood that the power lift attachment may take other suitable modifications and it may be of the mechanical type as well as the hydraulic type disclosed herein. The tractor has a power take-off shaft 15 which may be used to drive other attachments separate from the power lift mechanism. It is also to be understood that the tractor may take other modifications of well-known commercial type constructions.

Figures 1 and 2 show the construction of the superstructure attached to the tractor for supporting the cane cultivator and the construction of the frame work for mounting the tillage tools. The cane cultivator attachment comprises a forwardly mounted transversely extending draft member 16 attached to the tractor by means of forwardly extending supports 17, attached to the side sills 5 of the tractor. The supports 17 are securely braced to the front bolster of the tractor by braces 18. A transverse draft member 16 may be welded or otherwise secured to the support members 17. Extending rearwardly from the draft member 16 are parallel draft links 19. The draft links 19 are pivotally mounted on draft brackets 20 clamped to the draft member 16. The draft brackets 20 may be adjusted laterally on the draft member 16 in order to adjust the tillage frame structure laterally for different row widths. The rear ends of the parallel draft links 19 are connected to implement frames 21 and 22. The tillage frames 21 and 22 are similarly constructed. Therefore, only one will be described. Similar reference characters will denote similar parts. The parallel draft links 19 are in pairs and are pivotally connected to the tillage frames 21 and 22 at laterally spaced points on the frame structure by means of pivot brackets 23 secured to the implement frames 21 and 22. The parallel draft links 19 extend rearwardly and are substantially parallel to the side frame members 5 of the tractor. The front ends of the draft links extend upwardly and are journaled in the draft brackets 20', while the rear ends of the draft links 19 extend downwardly and are journaled in the pivot brackets 23.

The implement frames 21 and 22 are substantially rectangular and are securely braced and have mounted, at their mid-portions, a longitudinally extending beam structure 24 comprising spaced members 25 and 26. The members 25 and 26 extend rearwardly of the frame structures and have supported thereon a downwardly extending standard 27 to which a plow bottom or middle buster bottom 28 preferably is attached. The standard 27 is securely braced by a brace 29. The middle buster bottom 28 may be adjusted vertically by means of adjusting holes in the standard and by the adjustable brace 29. The ground engaging tools in the nature of a disk cultivator attachment are attached to the implement frames 21 and 22. Attached to the rear portion of each implement frame are pivot castings 30. Journaled in the pivot castings are disk gang heads 31 to which yoke standards 32 are attached. Attached to the yoke standards are disk gangs 33 comprising the usual arbor bolt construction to which disks 34 are secured. The construction of the implement frames and their corresponding disk cultivator attachments is similar. The disk gangs may be arcuately adjusted in a vertical plane by means of the disk gang head and yoke standards and also may be adjusted angularly in a horizontal plane. As shown in Figures 1 and 2, the disk gangs are set as out-throw gangs, but it is to be understood that the disk gangs may be reversed for in-throw purposes. In order to adjust the disk gangs 33 of each implement frame, respectively, in a horizontal plane, there is mounted on the longitudinally extending beam structure 24 formed by the members 25 and 26, an adjusting mechanism 35. Each set of gangs attached to the implement frames 21 and 22 are adjusted in a similar manner by their respective adjusting mechanisms 35. As each adjusting mechanism is similar, only one will be described. Pivoted between the beam members 25 and 26 at their rear portions are adjusting levers 36. The adjusting levers 36 are bent inwardly and extend rearwardly to within reach of the operator's station 11 on the tractor. The levers are adjusted and locked in adjusted position by the usual detent and quadrant. A quadrant 37 is secured to the beam member 26 on the right implement frame 22 and is supported by the beam member 25 on the left implement frame 21. The detent is actuated by the usual thumb latch. The lever 36 extends below the beam members 25 and 26 and has formed thereon a lateral and downwardly extending portion 36'. A similar portion is laterally spaced therefrom and secured to the lower end of the lever and is pivoted at the same point as the lever. Journaled within the lower portion of the lever 36, formed by the members 36' and the laterally spaced member, are eye members 38. The eye members 38 are secured at their inner ends to a pipe spacer. The eye members are outside of the members 36' and the other laterally spaced member attached to the lower part of the lever end and are journaled thereon. Attached to these eye members 38 are forwardly extending adjusting links 39 and 40. The adjusting links 39 and 40 extend forwardly to the disk gang heads 31 of the respective laterally spaced disk gangs 33. The adjusting links 39 and 40 are pivotally secured to link supporting arms 41 and 42 secured to the disk gang heads of the disk gangs 33 and 33' respectively. The link supporting arms extend inwardly from the disk gang heads 31. It is therefore seen that by operating the lever 36 forwardly the gangs 33 and 33' are adjusted simultaneously in a horizontal plane to whatever angle it is desired to operate the disk gangs. The disk gangs 33 and 33' have adjustable draft members 43 attached at their lower ends to the inner supporting bracket of each disk gang respectively and at their upper ends to the longitudinal beam members 25 and 26 respectively. The adjustable draft members 43 are made in two parts with a turn buckle for adjusting the position of the gangs forwardly or rearwardly. In order to gauge the tillage tools previously described, gauge wheels are adjustably supported on the forward portions of the implement frames 21 and 22 respectively. Each gauge wheel adjusting mechanism on the implement frames 21 and 22 is similar so only one will be described and similar reference characters will denote similar parts on each implement frame. Downwardly and forwardly extending supporting brackets 45 are secured to the forward portions of the implement frames 21 and 22. Journaled at the lower ends of the downwardly extending supporting brackets is a transverse draft member 47. The transverse draft member 47 is in the form of a square bar. Axle members 48 and 49 to which gauge wheels 50 and 51 are journaled, are connected at their forward ends to the transverse draft member 47. The gauge wheels 50 and 51 forming furrow following means are in the shape of gong wheels, although any other type of gauge wheel or shoe may be used. The upper ends of the axle members 48 and 49 are secured to clamping members. The axle members are clamped to the transverse member 47, as previously described. In order to adjust the gauge wheels vertically, there is attached to the rockshaft or draft member 47, a downwardly inclined adjusting arm. At the lower end of the arm, there is pivotally attached a screw threaded adjusting member 52. Telescopically and adjustably mounted in the adjusting member is a manual adjusting lever 53. This adjusting lever 53 may extend to within reach of the operator's station, but in the preferred embodiment it is best shown in Figure 1. The adjusting lever is rotatably mounted in a bracket or support secured to the longitudinal beam members 25 and 26. Studs on each side of the bracket retain the adjusting lever 53 in a fixed position, so that, as the lever 53 is adjusted, the adjusting member 52 is adjusted thereon and it in turn rocks the transverse draft member 47, thus raising or lowering the adjusting wheels simultaneously. The member to which the adjusting lever is rotatably mounted is secured to the draft members 25 and 26, while the adjusting lever 53 is positioned between the members 25 and 26. It is, therefore, seen that a simple mechanism is obtained for adjusting the gauge wheels. Each implement frame 21 and 22 has its respective gauge wheel adjusting mechanism.

In order that each implement frame 21 and 22 may follow the furrows to be cultivated, each implement frame, as previously described, has been mounted for translational movement laterally with respect to the main draft member 16 and to the tractor frame to which the draft member is attached. Lateral translational movement of each implement frame 21 and 22 is permitted by the parallel draft links 19 connecting each implement frame 21 and 22 to the transverse draft member 16. However, to limit and to confine this translational movement of each implement frame and to stabilize each implement frame with respect to the other, a stabilizing mechanism is desirable. The stabilizing mechanism prevents undue penetration of each implement frame caused by the suction of the tillage tools connected thereon and tends to balance the forces set up by the tillage tools on each implement frame and to prevent the turning of the tractor laterally and also to reduce the bending moments on the lateral extensions of the transverse draft members. In order to accomplish the foregoing, a transverse stabilizing member 54 in the form of a U-shaped rearwardly extending portion, from which extend transverse portions 54' and 54'', is attached to the underportion of the tractor by means of the bearing brackets 55. The horizontal portion of the center U-shaped stabilizing member is journaled in bearing brackets 55 in order to permit angular vertical movement in a vertical plane of the stabilizing member 54. The transverse portions 54' and 54'' extend laterally with respect to the side frame members 5, of the tractor and lie in the same transverse horizontal plane and are parallel to the plane of the side frame members 5 of the tractor. To support the implement frames 21 and 22 and to guide them on the transverse portions 54' and 54'' of the stabilizing member 54, there is mounted on the implement frames 21 and 22 upwardly extending U-shaped brackets 56 and 56', respectively. The U-shaped brackets are welded or otherwise secured to transverse supports 57 attached to the implement frames 21 and 22. Mounted on the U-shaped brackets 56 and 56' at the upper ends thereof are longitudinally extending upper and lower spaced rollers 58 and 59. The transverse portions 54' and 54'' of the stabilizing member 54 are mounted between the laterally spaced roller bracket members 56 and 56', respectively, of each implement frame 21 and 22. It is, therefore, seen that the implement frames 21 and 22 may have free movement of translation laterally on the portions 54' and 54'' of the stabilizing member 54. The rollers 58 and 59 are sufficiently long to permit of a slight longitudinal movement of the implement frames to the front and rear, which is necessary because of the parallel movement of the draft links 19. It is, therefore, obvious that each implement frame 21 and 22 may freely follow the furrows between the cane beds, which are being cultivated, and follow freely any deviation in the rows and at the same time obtain uniform depth of cultivation by the tools on each implement frame 21 and 22 because of the stabilizing member 54.

At times, however, in various operations in the cultivation of cane beds, it is necessary to build up or tear down the cane beds. In order to do this, it is necessary to provide for a given lateral adjustment of the implement frames. Shifting levers are also necessary for moving the implement frames in and out laterally to make it possible for the operator to keep the cultivating appliances midway between the rows, especially during the operation when the dirt is thrown toward the center and there are no furrows to guide the cane cultivating gangs. In order to accomplish this, individual adjustment of each implement frame 21 and 22 is necessary. To adjust the implement frames 21 and 22 an adjusting mechanism 60 is mounted on each side of the tractor and extends to within reach of the operator's station 11. The adjusting mechanism of each implement frame is the same and, therefore, only one need be described, and similar reference characters will denote similar parts. The adjusting mechanism 60 comprises adjusting levers 61 pivoted on the side frame 5 of the tractor and extending to within reach of the operator's station 11. The adjusting lever is adjusted in the usual manner about an adjusting quadrant 62 secured to the side frame members 5 of the tractor. Attached to the lower end of the adjusting lever 61 is a forwardly extending adjusting link 63, which is connected to a bell crank lever 64, which is pivotally mounted on a transverse supporting member 65. The bell crank 64 for each adjusting mechanism 60 is pivotally mounted on the transverse member 65. Laterally extending and pivotally connected to the bell crank levers 64 are adjusting links 66. The adjusting links 66 are connected pivotally to each implement frame 21 and 22 on the inner sides thereof by a suitable connecting bracket 67. It is, therefore, seen that, by the operation of either the right hand lever 61 or the left hand lever 61', the implement frames may be adjusted laterally on the stabilizing member 54. It is also to be understood that the transverse stabilizing member 54 is in the nature of a main transverse implement frame to which the smaller implement frames 21 and 22 are attached. The smaller implement frames 21 and 22 may be considered as subframes. As the levers 61 and 61' extend rearwardly to within reach of the operator's station 11, it is, therefore, obvious that the operator may readily adjust the subframes 21 and 22 on the main transverse frame 54 with relative ease.

In order to transport the cane cultivator from place to place, it is necessary to raise the main transverse frame and the attached subframes. The subframes 21 and 22, which are connected to the main transverse frame or stabilizing member 54, are permitted to rise vertically because the transverse member 54 is journaled by the brackets 55 to the main frame of the tractor. The main frame of the tractor along with the transverse frame member 54 may constitute the main implement frame. Attached to the transverse draft member 16 and laterally spaced thereon are front lifting brackets 68. Pivotally mounted thereon are rearwardly and upwardly extending, hairpin-shaped lifting arms 69. Attached to the lifting arms and extending rearwardly therefrom and longitudinally with the body of the tractor are actuating shafts 70. These shafts 70 are connected at their rear ends eccentrically to lifting arms 71 and 72 of the hydraulic lift mechanism 12. It is, therefore, to be understood that, as the hydraulic lift mechanism is actuated, the lifting cranks 71 and 72 are reciprocated or oscillated in a fore and aft direction and the reciprocating motion of the lifting cranks is transmitted to the actuating shafts 70. The angular motion of the lifting cranks 71 and 72 is greater than 180 degrees in order to lock the actuating shafts 70 in their rear and forward positions in a substantially dead center latch relationship. As shown in Figure 1, the cane cultivator attachment is lowered for working position. As the lifting arms 71 and 72 are oscillated to their forward position, the actuating shafts 70 are given a forward and upward motion because of the lifting arm 69, which is pivoted to the front transverse draft member. The upward motion of the actuating shafts 70 is sufficient to raise the cane cultivator from its working position to its transporting position. This raising and lowering motion of the actuating shaft 70 is transmitted to the transverse stabilizing member 54 by means of a flexible lifting chain 73. The lifting chain 73 is connected at its upper end to the actuating shaft by a bracket 74 and at its lower end to the transverse portion 54' and 54'' by a connecting bracket 75. As each actuating shaft 70 and its respective mechanism is the same on each side of the tractor, only one has been described, and similar reference characters will denote like parts on each side of the tractor. It is, therefore, obvious that, as the actuating shafts are reciprocated or oscillated longitudinally of the tractor, the lifting links 73 connecting the transverse portions 54' and 54" of the transverse member 54 will in turn raise and lower the transverse member in a reciprocatory motion vertically, this raising and lowering motion in turn being transmitted to the subframes 21 and 22. As the subframes 21 and 22 are raised and lowered, any vertical motion that is necessary for this movement is accommodated by the brackets 20' pivoted on the draft bracket 20 as at 20". The transverse draft brackets 20 are held in their adjusted position on the transverse draft members 16 by suitable adjusting bolts 76. The actuating shafts 70 are actuated from the operator's station 11 by the operator turning a valve 77 within reach of the operator's station. The valve 77 governs the raising or lowering position of the hydraulic lift mechanism.

The draft links 19 connected to the implement subframes 21 and 22. Being parallel, permit a parallel movement in a longitudinal direction of the subframes and also permit a free movement of translation laterally and, as the parallel draft links are connected to the draft brackets 20" which are free to pivot on the draft brackets 20, a vertical movement is permitted of the subframes 21 and 22. The lifting links 73, being flexible, act as a lost motion connection between the main implement frame and the raising and lowering mechanism, so that, when the ground engaging tools are in their working position, the gauge wheels 50 may gauge the implement tools at the depth to which the gauge wheels are set. Similarly, the gauge wheels, being mounted on the implement frames 21 and 22, permit the ground engaging tools to follow freely any lateral deviation of the furrows between the cane beds, because of the parallel draft link connection of the implement frames to the main transverse draft member and because of the free motion of translation laterally of the implement frames with respect to the stabilizing member 54. In addition, any rise or fall of the cane cultivator attachment is permitted because of the free vertical movement of the stabilizing member 54.

Several operations may be performed with the cane cultivator just described, but there are also other operations in which special tools are needed. It is, therefore, obvious that other cane cultivator attachments may be attached to the subframes 21 and 22 without departure from the scope of the invention. As the cane shoots grow, it is necessary to keep on with the cultivation, but at the same time it is also necessary to provide more clearance underneath the tractor. In order to accomplish this, larger traction wheels and a high wheel front carriage attachment are used. Also, it is necessary in cane cultivation to provide for lateral adjustment of the rear wheels and lateral adjustment of the front wheels to follow the furrows between the cane beds left by the cane cultivating tools. In addition, in different sections of the world, different planting widths of the cane beds are used. It is desirable, therefore, to be able to adjust the rear wheels of the tractor and the front wheels of the steering forecarriage to correspond with the lateral adjustment of the cultivator tools which follow the furrows between the cane beds. With the cane cultivator attachment at present disclosed, all of the various operations of cane cultivation can be performed. In addition, with this type of forwardly mounted cane cultivator, as the operator travels down the cane beds, he can readily see the performance of the tillage tools and be able to adjust all of the tools readily from the operator's station, as all of the adjusting levers extend to within easy reach of the operator.

In the operation of the cane cultivator attachment, the operator sets the disk gangs, as best shown in Figures 1 and 2, and as previously described. If he wishes to build up the cane beds, they are set, as shown in Figures 1 and 2, for in-throw cultivation, but, if he wishes to cut away the cane beds to aerate them, the gangs are reversed 180 degrees from that shown in the figures. The disk gangs may be adjusted laterally in either direction on each subframe 21 and 22, as previously described, and the cut of the gangs may also be adjusted by the levers 36. The depth of the gauge wheels, to determine the depth of penetration of the disks, is adjusted by the adjusting lever 53. As the implement frame is lowered into cultivating position, the raising and lowering chains 73 determine the maximum depth to which the implement may penetrate, although they are controlled by the gauge wheels primarily, the chains performing a lost motion connection between the raising and lowering mechanism and the implement frame.

In transporting the cane cultivator, the operator actuates the valve 77 of the hydraulic lift mechanism 12 and with the motor running to actuate the pump 13. The chain, connected to the transverse shaft to which the lifting cranks 71 and 72 are connected, is reciprocated either to raise or to lower the cane cultivator attachment. On the completion of its cycle, the raising or lowering mechanism is locked in its raised or lowered position and the chains 73 form a lost motion connection between the implement frame and the raising and lowering mechanism.

As previously pointed out, other attachments may be attached to the subframes after the removal of the disk gangs and the center middle buster attachment. It is also to be understood that other attachments in the nature of cultivating tools or planting attachments may be attached to the implement frames or to the subframes without departing from the scope of the invention. Also, the operator may cultivate or break down the beds by use of the adjusting levers 60 or 60', which actuate the subframes 21 and 22 to move laterally in or out, depending upon the kind of cultivation desired. It is also to be understood that the gauge wheels of the gauge mechanism may move laterally on the transverse draft members 47, to which the gauge wheels are attached. From the preceding description, it is evident that there has been provided an attachment which may be readily connected to and disconnected from the tractor for the subsequent attaching of other tractor mounted implement attachments. Furthermore, a cane cultivator attachment has been provided for a tractor of general purpose type which will meet all of the requirements of cane cultivation.

The preferred embodiment of this invention herein described is capable of certain modifications without departure from the scope of the invention to be defined in the following claims.

What is claimed is:

1. The combination with a wheel supported frame, of an implement attachment mounted on said wheel supported frame, said implement attachment comprising transverse frame means mounted on said wheel supported frame for reciprocatory motion vertically with respect to the wheel supported frame, an implement frame, ground engaging tools mounted on said implement frame, furrow following means carried by the frame, and means for mounting said implement frame on said transverse frame means for a free lateral movement of translation whereby said ground engaging tools are free to follow the furrows of plant rows.

2. The combination with a wheel supported frame, of an implement attachment mounted on said wheel supported frame, said implement attachment comprising transverse frame means mounted on said wheel supported frame for oscillatory motion vertically with respect to the wheel supported frame, an implement frame, ground engaging tools mounted on said implement frame, and means for mounting said implement frame on said transverse frame means for lateral movement of translation.

3. The combination with a motor propelled vehicle having a narrow longitudinal body portion and wheels mounted for adjustment laterally, of an implement attachment mounted on said motor propelled vehicle, said implement attachment comprising transverse frame means mounted on said narrow longitudinal body portion for reciprocatory motion vertically with respect to the narrow longitudinal body portion, a plurality of implement frames laterally spaced along the sides of the narrow longitudinal body portion, means for mounting said implement frames on said transverse frame means for lateral movement, and means for adjusting the implement frames laterally whereby the centre line of the wheels and the centre lines of the implement frames will correspond to the spacing of the row crops.

4. The combination with a motor propelled vehicle having a narrow longitudinal body portion, of an implement attachment mounted on said motor propelled vehicle, said implement attachment comprising transverse frame means mounted on said narrow longitudinal body portion for reciprocatory motion vertically with respect to said body portion, a plurality of implement frames laterally spaced along the sides of the narrow longitudinal body portion, means for mounting said implement frames on said transverse frame means for lateral movement, transverse draft means mounted on the forward portion of said narrow longitudinal body portion, and draft means connecting said implement frames to said transverse draft means.

5. The combination with a motor propelled vehicle, of an implement attachment mounted on said vehicle, said implement attachment comprising transverse frame means mounted on said vehicle for reciprocatory motion vertically with respect to said vehicle, a plurality of implement frames laterally spaced along the sides of the vehicle, ground engaging tools on said implement frames, furrow following means carried by the frame, means for mounting said implement frames on said transverse frame means for free lateral movement of translation, transverse draft means extending laterally on each side of said vehicle and connected thereto, and draft means connecting said implement frames to said transverse draft means whereby said ground engaging tools are free to follow the furrows of plant rows.

6. The combination with a motor propelled vehicle, of an implement attachment mounted on said vehicle, said implement attachment comprising transverse frame means mounted on said vehicle for reciprocatory motion vertically with respect to said vehicle, an implement frame laterally spaced along the side of the vehicle, ground engaging tools on said implement frame, means for mounting said implement frame on said transverse frame means for lateral movement, transverse draft means extending laterally from the side of said vehicle and connected thereto, and parallel draft means connecting said implement frame to said transverse draft member whereby said implement frame may move laterally with respect to the vehicle.

7. The combination with a motor propelled vehicle having a power lift mechanism actuated from the motor, of an implement attachment comprising transverse frame means mounted on said vehicle for reciprocatory motion vertically with respect to said vehicle, an implement frame laterally mounted on said transverse frame means, transverse draft means extending laterally from the side of said vehicle and connected thereto, draft means connecting said implement frame to said transverse draft means whereby said implement frame may be raised vertically, and means connecting said power lift mechanism to said transverse frame means whereby upon the operation of said power lift mechanism the implement frame is raised and lowered.

8. The combination with a motor propelled vehicle having a power lift mechanism actuated from the motor, of an implement attachment comprising transverse frame means mounted on said vehicle for reciprocatory motion vertically with respect to said vehicle, an implement frame laterally mounted on said transverse frame means for free lateral motion of translation, transverse draft means extending laterally from the side of said vehicle and connected thereto, draft means connecting said implement frame to said transverse draft means, said draft means comprising draft connections whereby said implement frame may have movement laterally and vertically, lifting means extending longitudinally of the vehicle and connected to the power lift mechanism for reciprocatory movement, and lost motion means connecting said transverse frame means to said lifting means whereby said transverse frame means and the attached implement frame is free to rise and fall vertically in ground engaging position.

9. The combination with a motor propelled vehicle having an operator's station, of an implement attachment mounted on said vehicle comprising transverse frame means mounted on said vehicle for reciprocatory motion vertically with respect to said vehicle, an implement frame laterally mounted on said transverse frame means for lateral movement, ground engaging tools adjustably mounted on said implement frame, and means for adjusting said ground engaging tools mounted on said implement frame and extending to within reach of the operator's station.

10. The combination with a motor propelled vehicle having an operator's station, of an implement attachment mounted on said vehicle comprising transverse frame means mounted on said vehicle for reciprocatory motion vertically with respect to said vehicle, an implement frame laterally mounted on said transverse frame means for lateral movement, and means for adjusting said implement frame laterally with respect to the vehicle, said adjusting means for said implement frame extending to within reach of the operator's station.

11. The combination with a motor propelled vehicle having an operator's station, of an implement attachment mounted on said vehicle comprising transverse frame means mounted on said vehicle for reciprocatory motion vertically with respect to said vehicle, an implement frame laterally mounted on said transverse frame means for lateral movement, transverse draft means mounted on said vehicle, draft means connecting said implement frame to said transverse draft means whereby said implement frame is free to move laterally, and means for adjusting said implement frame laterally with respect to the vehicle, said adjusting means for said implement frame extending to within reach of the operator's station.

12. The combination with a wheel supported frame, of an implement attachment mounted on said wheel supported frame, said implement attachment comprising frame means having downwardly and laterally extending portions mounted on said wheel supported frame for oscillatory motion vertically with respect to the wheel supported frame, implement frames mounted on said laterally extending portions of said frame means, and means for mounting said implement frames on said laterally extending portions for lateral movement of translation.

13. The combination with a wheel supported frame, of an implement attachment mounted on said wheel supported frame, said implement attachment comprising frame means having downwardly and laterally extending portions mounted on said wheel supported frame for oscillatory motion vertically with respect to the wheel supported frame, an implement frame mounted on said laterally extending portion of said frame means, and means connected to said laterally extending portions of said frame means for raising and lowering said implement frame.

14. The combination with a wheel supported frame, of an implement attachment mounted on said wheel supported frame, said implement attachment comprising frame means having downwardly and laterally extending portions mounted on said wheel supported frame for oscillatory motion vertically with respect to the wheel supported frame, an implement frame mounted on said laterally extending portion of said frame means, transverse draft means attached to the wheel supported frame, draft means connecting the implement frame and the transverse draft means, and means connected to said laterally extending portion of said frame means for raising and lowering said implement frame.

15. The combination with a motor propelled vehicle having a power lift mechanism actuated from the motor, of an implement attachment comprising frame means mounted on said vehicle having downwardly and laterally extending portions mounted on said vehicle for oscillatory motion vertically with respect to the wheel supported frame, an implement frame mounted on said laterally extending portion of said frame means for lateral movement, transverse draft means attached to the vehicle, draft means connecting said implement frame to said transverse draft means, said draft means comprising draft connections whereby said implement frame may have movement laterally and vertically, lifting means extending longitudinally of the vehicle and connected to the power lift mechanism for reciprocatory movement, and lost motion means connecting said laterally extending portion of said transverse frame means to said lifting means whereby said transverse frame means and the attached implement frame is free to rise and fall vertically in ground engaging position.

16. The combination with a motor propelled vehicle, of transverse draft means attached thereto, an implement frame, ground engaging tools mounted thereon, draft means connecting said implement frame to said transverse draft means whereby said implement frame is free to move laterally and vertically, stabilizing means mounted on said vehicle and connected to the implement frame whereby said implement frame is held in a substantially horizontal plane, and means for mounting said implement frame on said stabilizing means whereby said implement frame has a lateral movement of translation.

17. The combination with a motor propelled vehicle, of transverse draft means attached thereto, an implement frame, ground engaging tools mounted thereon, draft means connecting said implement frame to said transverse draft means whereby said implement frame is free to move vertically, stabilizing means mounted on said vehicle and connected to the implement frame whereby said implement frame is held in a substantially horizontal plane, means for mounting said stabilizing means for reciprocatory movement vertically, means for mounting said implement frame on said stabilizing means whereby said implement frame has a lateral movement of translation, and means connected to said stabilizing means for raising and lowering said implement frame.

18. The combination with a motor propelled vehicle, of transverse draft means attached thereto, implement frames laterally spaced on said vehicle and having ground engaging tools mounted thereon, draft means connecting said implement frames to said transverse draft means whereby said implement frames are free to move vertically and laterally, stabilizing means mounted on said vehicle and connected to the implement frames whereby said implement frames are held in a substantially horizontal plane, means for mounting said stabilizing means for reciprocatory movement vertically, means for mounting said implement frames laterally on said stabilizing means, and means connected to said stabilizing means for raising and lowering said implement frames.

19. The combination with a motor propelled vehicle having a power lift mechanism actuated from the motor, of transverse draft means attached to said vehicle, an implement frame having ground engaging tools mounted thereon, draft means connecting said implement frame to said transverse draft means whereby said implement frame is free to move vertically and laterally, stabilizing means mounted on said vehicle and connected to the implement frame whereby said implement frame is held in a substantially horizontal plane, said stabilizing means comprising downwardly and laterally extending portions, means for mounting said stabilizing means for reciprocatory movement vertically, means for mounting said implement frame on said stabilizing means whereby said implement frame has a lateral movement of translation, and means connected to said laterally extending portion of said stabilizing means and said power lift mechanism for raising and lowering said implement frame.

20. The combination with a motor propelled vehicle, of transverse draft means attached to said vehicle, an implement frame having ground engaging tools mounted thereon, draft means connecting said implement frame to said transverse draft means whereby said implement frame is free to move laterally, stabilizing means mounted on said vehicle and connected to said implement frame whereby said implement frame is held in a substantially horizontal position, said stabilizing means comprising downwardly and laterally extending portions, means for mounting said stabilizing means for reciprocatory movement vertically, and means for mounting said implement frame on said laterally extending portion of said stabilizing means whereby said implement frame has a lateral movement of translation.

WILLIAM S. GRAHAM.